(12) United States Patent  
Ootsuki et al.

(10) Patent No.: US 8,431,047 B2
(45) Date of Patent: Apr. 30, 2013

(54) POLYVINYL ACETAL RESIN COMPOSITION

(75) Inventors: Kenichi Ootsuki, Shiga (JP); Motokuni Ichitani, Shiga (JP); Takayuki Maeda, Shiga (JP); Yuki Hirose, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 369 days.

(21) Appl. No.: 12/921,450

(22) PCT Filed: Sep. 16, 2009

(86) PCT No.: PCT/JP2009/066153
§ 371 (c)(1),
(2), (4) Date: Nov. 22, 2010

(87) PCT Pub. No.: WO2010/055731
PCT Pub. Date: May 20, 2010

(65) Prior Publication Data
US 2011/0049434 A1    Mar. 3, 2011

(30) Foreign Application Priority Data

Nov. 13, 2008  (JP) .................................. 2008-291362

(51) Int. Cl.
*H01B 1/00* (2006.01)
*C08F 283/00* (2006.01)
*C03B 29/00* (2006.01)
*B32B 3/00* (2006.01)

(52) U.S. Cl.
USPC ......... 252/500; 525/472; 156/89.11; 428/210

(58) Field of Classification Search .................. 252/500; 525/472; 156/89.11; 428/210
See application file for complete search history.

(56) References Cited

U.S. PATENT DOCUMENTS

2006/0014049 A1* 1/2006 Ichinose et al. ............... 428/701
2006/0096692 A1  5/2006 Sato et al.

FOREIGN PATENT DOCUMENTS

| EP | 0 457 190 | 11/1991 |
|---|---|---|
| EP | 1 637 546 | 3/2006 |
| EP | 1 921 095 | 5/2008 |
| JP | 3-35762 | 5/1991 |
| JP | 4-49766 | 8/1992 |
| JP | 2001-89245 | 4/2001 |
| JP | 3193022 | 5/2001 |
| JP | 2002-104878 | 4/2002 |
| JP | 2002104878 A * | 4/2002 |
| JP | 2006-83060 | 3/2006 |
| WO | 2008/143195 | 11/2008 |

OTHER PUBLICATIONS

Office Action issued in counterpart JP Appln. No. 2009-541530 received on May 25, 2010 (in Japanese language).

(Continued)

*Primary Examiner* — Mark Kopec
*Assistant Examiner* — Jaison Thomas
(74) *Attorney, Agent, or Firm* — Wenderoth, Lind & Ponack, L.L.P.

(57) ABSTRACT

It is an object of the present invention to provide a polyvinyl acetal resin composition capable of giving a ceramic green sheet which has sufficient flexibility and is hardly damaged even when being formed into a thin film and comprises a polyvinyl acetal resin composition containing a polyvinyl acetal resin A and a polyvinyl acetal resin B incompatible with the polyvinyl acetal resin A, which is formed by acetalizing a mixed polyvinyl alcohol containing two or more kinds of polyvinyl alcohols wherein a phase composed of the polyvinyl acetal resin A and a phase composed of the polyvinyl acetal resin B form a sea-island structure.

10 Claims, 1 Drawing Sheet

OTHER PUBLICATIONS

International Search Report issued Dec. 15, 2009 in International (PCT) Application No. PCT/JP2009/066153.
Extended European Search Report for counterpart EP Application No. 09825984.9 issued on Jun. 27, 2012.

* cited by examiner

[Fig. 1]
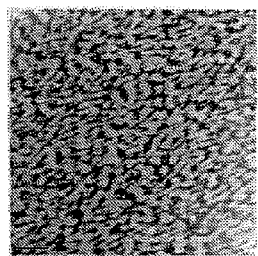
[Fig. 2]
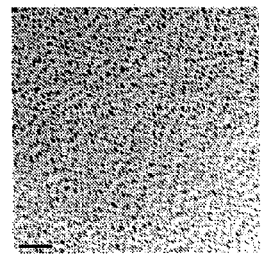
[Fig. 3]
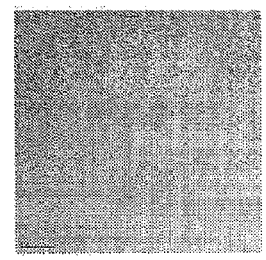
[Fig. 4]
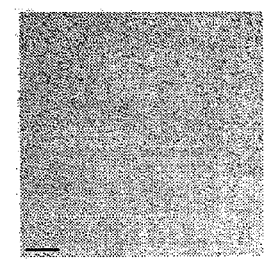
[Fig. 5]
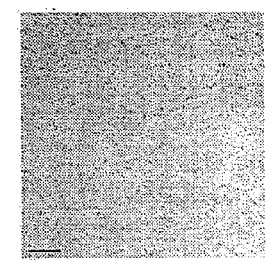

POLYVINYL ACETAL RESIN COMPOSITION

This application is a U.S. national stage of International Application No. PCT/JP2009/066153 filed Sep. 16, 2009.

TECHNICAL FIELD

The present invention relates to a polyvinyl acetal resin composition capable of giving a ceramic green sheet which has sufficient flexibility and is hardly damaged even when being formed into a thin film, when the polyvinyl acetal resin composition is used as, for example, a binder for a ceramic green sheet. Also, the present invention relates to a ceramic slurry, a ceramic paste, a ceramic green sheet, a conductive paste and an interlayer film for laminated glass for automobiles, each produced by using the polyvinyl acetal resin composition.

BACKGROUND ART

Laminated electronic devices such as a laminated ceramic capacitor are generally produced by undergoing the following steps, as described in Patent Document 1 and Patent Document 2.

First, to a solution obtained by dissolving a binder resin such as a polyvinyl butyral resin or a poly(meth)acrylic ester resin in an organic solvent, a plasticizer, a dispersant and the like are added, then a ceramic raw material powder is added to the mixture, and the resulting mixture is mixed homogeneously with a ball mill or the like and defoamed to give a ceramic slurry composition having a certain viscosity. The obtained slurry composition is applied by casting onto a surface of a supporting member such as a polyethylene terephthalate film or a SUS plate subjected to a releasing treatment using a doctor blade, a reverse roll coater or the like, the applied slurry composition is heated to evaporate volatile components such as the organic solvent, and then the dried slurry composition is peeled off from the supporting member to give a ceramic green sheet.

Next, a plurality of processed sheets, which are formed by applying a conductive paste to be an internal electrode onto the obtained ceramic green sheet by screen printing or the like, are alternately overlaid, and the respective layers of the overlaid material are thermocompression bonded to one another to give a laminate. After performing a treatment to remove binder resin components and the like contained in this laminate by thermal decomposition, a so-called degreasing treatment, the laminate is burnt out, and the resulting ceramic burnt body undergoes the step of connecting an external electrode to an end face thereof by sinter joining to give a laminated ceramic capacitor.

In recent years, the thickness of the ceramic green sheets is reduced as the laminated ceramic capacitors have higher capacity, and for example, in Patent Document 3, there is disclosed a method of producing a ceramic green sheet having a thickness of 5 µm or less by using a polyvinyl acetal resin having a polymerization degree of 1200 to 2400.

However, if the thickness of the ceramic green sheets is further reduced, the ceramic green sheets formed by using a conventional polyvinyl acetal resin have a problem that the ceramic green sheet is damaged at the time of being peeled off from a supporting member.

Accordingly, a binder capable of giving a ceramic green sheet which is hardly broken even when formed into a thin film is required in order to fulfill the recent requirement of a reduction in film thickness of the ceramic green sheet associated with an increase in capacity of the laminated ceramic capacitor.

Patent Document 1: Japanese Kokoku Publication Hei-3-35762 (JP-B Hei-3-35762)
Patent Document 2: Japanese Kokoku Publication Hei-4-49766 (JP-B Hei-4-49766)
Patent Document 3: Japanese Patent Publication No. 3193022

DISCLOSURE OF THE INVENTION

Problems to be Solved by the Invention

In view of the above state of the art, it is an object of the present invention to provide a polyvinyl acetal resin composition capable of giving a ceramic green sheet which has sufficient flexibility and is hardly damaged even when being formed into a thin film, when the polyvinyl acetal resin composition is used as, for example, a binder for a ceramic green sheet. It is another object of the present invention to provide a ceramic slurry, a ceramic paste, a ceramic green sheet, a conductive paste and an interlayer film for laminated glass for automobiles, each produced by using the polyvinyl acetal resin composition.

Means for Solving the Problems

The present invention pertains to a polyvinyl acetal resin composition containing a polyvinyl acetal resin A and a polyvinyl acetal resin B incompatible with the polyvinyl acetal resin A, which is formed by acetalizing a mixed polyvinyl alcohol containing two or more kinds of polyvinyl alcohols having different saponification degrees, and wherein the mixed polyvinyl alcohol contains main two kinds of polyvinyl alcohols in which X and Y satisfy the relationship of the following equation (1):

[Formula 1]

$$|X-Y| \geq 10 \qquad (1)$$

in which X represents the saponification degree of any one polyvinyl alcohol a of the polyvinyl alcohols contained in the mixed polyvinyl alcohol and Y represents the saponification degree of a polyvinyl alcohol b other than the polyvinyl alcohol a, and wherein in denoting, by M, the polymerization degree of one polyvinyl alcohol having a higher polymerization degree of the main two kinds of polyvinyl alcohols and denoting the polymerization degree of the other polyvinyl alcohol by N, M and N have the relationship of the following equation (2):

[Formula 2]

$$M/N \leq 3 \qquad (2)$$

and a phase composed of the polyvinyl acetal resin A and a phase composed of the polyvinyl acetal resin B form a sea-island structure.

Hereinafter, the present invention will be described in detail.

The present inventors made intensive investigations, and consequently found that when a polyvinyl acetal resin composition, which is obtained by using a predetermined polyvinyl alcohol and in which a phase composed of a polyvinyl acetal resin A and a phase composed of a polyvinyl acetal resin B incompatible with the polyvinyl acetal resin A form a sea-island structure, is used as a binder for a ceramic green sheet or the like, the resulting ceramic green sheet has moderate flexibility and hardly causes damages such as breakage even when being formed into a thin film. These findings have now led to completion of the present invention.

The polyvinyl acetal resin composition of the present invention contains a polyvinyl acetal resin A and a polyvinyl acetal resin B incompatible with the polyvinyl acetal resin A, and a phase composed of the polyvinyl acetal resin A and a phase composed of the polyvinyl acetal resin B form a sea-island structure.

By having such a structure, it becomes possible to achieve characteristics such as an improvement in mechanical strength and impartment of flexibility.

In the present invention, the sea-island structure means a structure in which a phase composed of one component (island component) is dispersed in a phase composed of another component (sea component). In the present invention, a state that the dispersion diameter of the phase composed of the island component is 0.07 μm or more is referred to as a state "having a sea-island structure". When the dispersion diameter of the phase composed of the island component is less than 0.07 μm, characteristics of the sea component appear intensely and characteristics of the island component are not adequately exhibited.

In the present invention, the polyvinyl acetal resin A may be the island component and the polyvinyl acetal resin B may be the sea component, or the polyvinyl acetal resin B may be the island component and the polyvinyl acetal resin A may be the sea component.

When the content of the polyvinyl acetal resin A is larger than that of the polyvinyl acetal resin B, the polyvinyl acetal resin A is the sea component, and when the content of the polyvinyl acetal resin A is smaller than that of the polyvinyl acetal resin B, the polyvinyl acetal resin A is the island component.

When the amount of the polyvinyl acetal resin A to be added is equal to that of the polyvinyl acetal resin B, the component having a higher polymerization degree is the sea component and the component having a lower polymerization degree is the island component. However, the saponification degree does not matter in distinguishing the sea component from the island component.

The configuration of the phase composed of the island component is not particularly limited, and examples thereof include a sphere, a rod-like shape, a plate-like shape, a thin film shape, a fibrous shape, and a tubular shape. Among these, the sphere is preferable.

The dispersion diameter of the phase composed of the island component can be determined by observing a cross-section of a resin using, for example, a transmission electron microscope (TEM). The transmission electron microscope is a microscope used to observe an internal structure of a material by allowing electron beams to pass through a specimen and taking a micrograph of electrons scattered or diffracted by atoms in the specimen as an electron diffraction pattern or a transmission electron microscopic image.

In the present invention, the dispersion diameter can be measured by, for example, the following method.

First, a specimen of a cross-section is prepared by cutting a ceramic green sheet using a microtome, and then micrographs of the cross-section are taken at a magnification of 3000 times using the transmission electron microscope (TEM). Diameters of all phases composed of the island component, which can be identified from the obtained images, are measured, and the range of the diameters, in which 80% of the phases composed of the island component are contained when the total number of the phases composed of the island component is taken as 100%, is defined as the dispersion diameter. Here, when the phase composed of the island component has a shape other than a sphere, the average of the longer diameter and the shorter diameter is taken as the diameter.

The polyvinyl acetal resin A is not particularly limited as long as it is a polyvinyl acetal resin which is incompatible with the polyvinyl acetal resin B and can form a sea-island structure in combination with the polyvinyl acetal resin B, and as the polyvinyl acetal resin A, a conventionally known polyvinyl acetal resin can be employed.

Also, the polyvinyl acetal resin B is not particularly limited as long as it is a polyvinyl acetal resin which is incompatible with the polyvinyl acetal resin A and can form a sea-island structure in combination with the polyvinyl acetal resin A.

In the polyvinyl acetal resin composition of the present invention, the mixing ratio of the polyvinyl acetal resin A to the polyvinyl acetal resin B is preferably 8:2 to 4:6 by weight. When the mixing ratio is out of the above range, characteristics of the component having a larger mixing ratio may appear intensely and characteristics of the component having a smaller mixing ratio may not adequately appear.

The polyvinyl acetal resin composition of the present invention may contain other components in addition to the polyvinyl acetal resin A and the polyvinyl acetal resin B as long as the effect of the present invention is not impaired. The other components are not particularly limited as long as they are resins incompatible with the polyvinyl acetal resin A and the polyvinyl acetal resin B, and examples thereof include a polyethylene resin, a polypropylene resin, an ethylene vinyl acetate resin, a polyvinyl alcohol resin, an ethylene vinyl alcohol resin, a phenolic resin, a vinyl chloride resin, a polyamide resin, an epoxy resin, a silicon resin, a polyester resin, an amino resin, a polyurethane resin, and the like.

The polyvinyl acetal resin composition of the present invention is formed by acetalizing a mixed polyvinyl alcohol containing two or more kinds of polyvinyl alcohols having different saponification degrees, and the mixed polyvinyl alcohol contains main two kinds of polyvinyl alcohols in which X and Y satisfy the relationship of the following equation (1).

[Formula 3]

$$|X-Y| \geq 10 \tag{1}$$

In the equation (1), X represents the saponification degree of any one polyvinyl alcohol a of the polyvinyl alcohols contained in the mixed polyvinyl alcohol and Y represents the saponification degree of a polyvinyl alcohol b other than the polyvinyl alcohol a.

The mixed polyvinyl alcohol contains two or more kinds of polyvinyl alcohols having different saponification degrees. Thus, by using the polyvinyl acetal resin composition obtained by acetalizing polyvinyl alcohols having different saponification degrees, flexibility and elongation at break in forming the polyvinyl acetal resin composition into a thin film can be significantly improved compared with the case where polyvinyl alcohols having the same saponification degree are used. In such a polyvinyl acetal resin composition formed by using polyvinyl alcohols having different saponification degrees as raw materials, since the component having a higher saponification degree is incompatible with the component having a lower saponification degree, when the glass transition temperature (Tg) is measured by DSC, two glass transition temperatures may be observed. The component having a lower saponification degree has high flexibility because of a low glass transition temperature, and flexibility and elongation at break of a sheet is significantly improved by mixing this component in the polyvinyl acetal resin composition.

The mixed polyvinyl alcohol contains main two kinds of polyvinyl alcohols in which X and Y satisfy the relationship of the equation (1).

By containing main two kinds of polyvinyl alcohols satisfying the relationship of the equation (1), the difference between the component having a lower saponification degree and a lower glass transition temperature and the component having a higher saponification degree and a higher glass transition temperature becomes clear, and, an effect of imparting flexibility by the component having a lower Tg is effectively exhibited.

In addition, when the mixed polyvinyl alcohol contains two kinds of polyvinyl alcohols, the combination of two kinds satisfying the relationship of the equation (1) is regarded as "main two kinds of polyvinyl alcohols". Further, when the mixed polyvinyl alcohol contains three or more kinds of polyvinyl alcohols, if there are a plurality of combinations of two kinds satisfying the relationship of the equation (1), the combination having the largest total content of polyvinyl alcohols is regarded as "main two kinds of polyvinyl alcohols". Furthermore, if there are a plurality of combinations having the largest total content of polyvinyl alcohols, the combination in which the difference between saponification degrees is largest is regarded as "main two kinds of polyvinyl alcohols". However, when the content of a polyvinyl alcohol other than the polyvinyl alcohols satisfying the relationship of the equation (1) exceeds the content of any one of the main two kinds of polyvinyl alcohols, this case is out of the scope of the present invention.

The mixed polyvinyl alcohol preferably contains a polyvinyl alcohol having a saponification degree of 95 mol % or more and a polyvinyl alcohol having a saponification degree of 85 mol %.

A portion formed by acetalizing a polyvinyl alcohol having a saponification degree of 95 mol % or more tends to provide high sheet strength since a hydrogen bond of the hydroxyl group is effectively formed. Further, a portion formed by acetalizing a polyvinyl alcohol having a saponification degree of 85 mol % or less tends to provide a flexible sheet since the hydrogen bond is hardly formed due to remaining acetyl groups. Thus, since polyvinyl acetal resins having different characteristics are mixed with one another, a polyvinyl acetal resin composition having high strength and excellent flexibility can be attained.

The lower limit of the saponification degree of the mixed polyvinyl alcohol is 70 mold. When the saponification degree of the mixed polyvinyl alcohol is less than 70 mol %, since the solubility of the mixed polyvinyl alcohol in water is deteriorated, acetalization becomes difficult, and since the amount of hydroxyl groups is reduced, it becomes difficult to adequately increase the acetalization degree. A preferred lower limit of the saponification degree of the mixed polyvinyl alcohol is 72 mol %.

The mixed polyvinyl alcohol can be prepared by saponifying a copolymer of a vinyl ester and ethylene. Examples of the vinyl ester include vinyl formate, vinyl acetate, vinyl propionate, vinyl pivalate and the like. Among others, vinyl acetate is suitable from the viewpoint of economy.

The mixed polyvinyl alcohol may be a copolymer with an ethylenically unsaturated monomer as long as the effect of the present invention is not impaired. Examples of the ethylenically unsaturated monomers include acrylic acid, methacrylic acid, phthalic acid (phthalic anhydride), maleic acid (maleic anhydride), itaconic acid (itaconic anhydride), acrylonitrile, methacrylonitrile, acrylamide, methacrylamide, trimethyl-(3-acrylamide-3-dimethylpropyl)-ammonium chloride, acrylamide-2-methylpropanesulfonic acid and a sodium salt thereof, ethyl vinyl ether, butyl vinyl ether, N-vinylpyrrolidone, vinyl chloride, vinyl bromide, vinyl fluoride, vinylidene chloride, vinylidene fluoride, tetrafluoroethylene, sodium vinylsulfonate, sodium allylsulfonate, and the like. Further, a polyvinyl alcohol terminated with the following substances, which is obtained by saponifying a copolymer obtained by copolymerizing a vinyl ester monomer such as vinyl acetate and ethylene in the presence of a thiol compound such as thiolacetic acid, mercaptopropionic acid, can also be employed.

The mixed polyvinyl alcohol may be formed by saponifying a copolymer obtained by copolymerizing the vinyl ester and an α-olefin. Furthermore, a polyvinyl alcohol containing a component derived from an ethylenically unsaturated monomer may be formed by copolymerizing the ethylenically unsaturated monomer. Further, a polyvinyl alcohol terminated with the following substances, which is obtained by saponifying a copolymer obtained by copolymerizing a vinyl ester monomer such as vinyl acetate and an α-olefin in the presence of a thiol compound such as thiolacetic acid, mercaptopropionic acid, can also be employed. The α-olefin is not particularly limited, and examples thereof include methylene, ethylene, propylene, isopropylene, butylene, isobutylene, pentylene, hexylene, cyclohexylene, cyclohexylethylene, cyclohexylpropylene, and the like.

A preferred lower limit of the polymerization degree of the mixed polyvinyl alcohol is 500 and a preferred upper limit is 3000. When the polymerization degree of the mixed polyvinyl alcohol is less than 500, a polyvinyl acetal resin composition having sufficient viscosity is not obtained and the strength of a ceramic green sheet when the polyvinyl acetal resin composition is formed into a thin film becomes insufficient. When the polymerization degree of the mixed polyvinyl alcohol is more than 3000, since the solubility of the polyvinyl acetal resin composition in water is deteriorated or the viscosity of an aqueous solution of the resin composition becomes too high, acetalization becomes difficult. Further, since the viscosity in dissolving the resin composition in an organic solvent is too high, dispersibility of a ceramic powder and coatability of a ceramic paste for a ceramic green sheet are deteriorated.

Here, the polymerization degrees of the polyvinyl acetal resin A and the polyvinyl acetal resin B can be determined by using the polymerization degree of the mixed polyvinyl alcohol as a raw material. Further, the polymerization degree of the mixed polyvinyl alcohol is determined from the average of polymerization degrees of the respective polyvinyl alcohols.

In the present invention, when the polymerization degree of the polyvinyl alcohol having a higher polymerization degree of the main two kinds of polyvinyl alcohols is denoted by M, and the polymerization degree of the other polyvinyl alcohol is denoted by N, M and N have the relationship of the following equation (2).

When polymerization degrees of the main two kinds of polyvinyl alcohols have such a relationship, since there is no large difference in fluidity between two kinds of polyvinyl alcohols, one component does not become compatible with the other component and a sea-island structure is produced, and therefore a resin having both characteristics of the sea component and the island component is formed.

[Formula 4]

$$M/N \leq 3 \qquad (2)$$

In the mixed polyvinyl alcohol, a preferred upper limit of the difference between polymerization degrees of the main two kinds of polyvinyl alcohols (hereinafter, also referred to just as the difference between polymerization degrees in the mixed polyvinyl alcohol) is 3000. When the difference between polymerization degrees in the mixed polyvinyl alcohol is more than 3000, since the main two kinds of polyvinyl alcohols become compatible with each other, an effect of imparting flexibility sometimes cannot be exhibited. Here, the difference between polymerization degrees in the mixed polyvinyl alcohol refers to an absolute value of the difference between polymerization degrees.

When the difference between polymerization degrees in the mixed polyvinyl alcohol is 2000 or less, in order to exhibit an excellent effect of the present invention more effectively, it is preferred that, in denoting the saponification degree of one polyvinyl alcohol of the main two kinds of polyvinyl alcohols by X (mol %) and denoting the saponification degree of the other polyvinyl alcohol by Y (mol %), X and Y have the relationship of the following equation (3).

[Formula 5]

$$30 \geq |X-Y| \geq 12 \tag{3}$$

When |X−Y| is smaller than 12, since the compatibility of polyvinyl alcohols to be mixed becomes high, an effect of imparting flexibility is hardly exhibited.

When |X−Y| is larger than 30, since the solubility of the polyvinyl alcohol having a lower saponification degree in water is deteriorated, an acetalization reaction becomes difficult or the solubility of a polyvinyl acetal resin composition to be obtained in a solvent is deteriorated.

For example, when a polyvinyl alcohol having a polymerization degree of 1700 and a saponification degree of 95 mol % is used, if a mixed polyvinyl alcohol of the above-mentioned polyvinyl alcohol and a polyvinyl alcohol having a polymerization degree of 1000 and a saponification degree of 80 mol % is acetalized, the effect of the present invention in another aspect can be adequately produced, but if a mixed polyvinyl alcohol of the above-mentioned polyvinyl alcohol and a polyvinyl alcohol having a polymerization degree of 1000 and a saponification degree of 85 mol % is acetalized, it may be impossible to produce an adequate effect.

Further, when the difference between polymerization degrees of polyvinyl alcohols to be mixed is larger than 2000 and 2500 or less, it is preferred that, in denoting the saponification degree of one polyvinyl alcohol of the main two kinds of polyvinyl alcohols by X (mol %) and denoting the saponification degree of the other polyvinyl alcohol by Y (mol %), X and Y have the relationship of the following equation (4).

[Formula 6]

$$30 \geq |X-Y| 20 \tag{4}$$

When |X−Y| is smaller than 20, since the compatibility of polyvinyl alcohols to be mixed becomes high, an effect of imparting flexibility is hardly exhibited.

When |X−Y| is larger than 30, since the solubility of the polyvinyl alcohol having a lower saponification degree in water is deteriorated, an acetalization reaction becomes difficult or the solubility of a polyvinyl acetal resin composition to be obtained in a solvent is deteriorated.

For example, when a polyvinyl alcohol having a polymerization degree of 3300 and a saponification degree of 99 mol % is used, if a mixed polyvinyl alcohol of the above-mentioned polyvinyl alcohol and a polyvinyl alcohol having a polymerization degree of 1000 and a saponification degree of 75 mol % is acetalized, the effect of the present invention in another aspect can be adequately produced, but if a mixed polyvinyl alcohol of the above-mentioned polyvinyl alcohol and a polyvinyl alcohol having a polymerization degree of 1000 and a saponification degree of 80 mol % is acetalized, it may be impossible to produce an adequate effect.

Furthermore, when the difference between polymerization degrees of polyvinyl alcohols to be mixed is larger than 2500, it is preferred that, in denoting the saponification degree of one polyvinyl alcohol of the main two kinds of polyvinyl alcohols by X (mol %) and denoting the saponification degree of the other polyvinyl alcohol by Y (mol %), X and Y have the relationship of the following equation (5).

[Formula 7]

$$30 \geq |X-Y| \geq 25 \tag{5}$$

When |X−Y| is smaller than 25, since the compatibility of polyvinyl alcohols to be mixed becomes high, an effect of imparting flexibility is hardly exhibited.

When |X−Y| is larger than 30, since the solubility of the polyvinyl alcohol having a lower saponification degree in water is deteriorated, an acetalization reaction becomes difficult or the solubility of a polyvinyl acetal resin composition to be obtained in a solvent is deteriorated.

For example, when a polyvinyl alcohol having a polymerization degree of 3300 and a saponification degree of 99 mol % is used, if a mixed polyvinyl alcohol of the above-mentioned polyvinyl alcohol and a polyvinyl alcohol having a polymerization degree of 500 and a saponification degree of 73 mol % is acetalized, the effect of the present invention in another aspect can be adequately produced, but if a mixed polyvinyl alcohol of the above-mentioned polyvinyl alcohol and a polyvinyl alcohol having a polymerization degree of 500 and a saponification degree of 80 mol % is acetalized, it may be impossible to produce an adequate effect.

In the mixed polyvinyl alcohol, the mixing ratio of the polyvinyl alcohol having a higher saponification degree of the main two kinds of polyvinyl alcohols to the other polyvinyl alcohol (polyvinyl alcohol having a higher saponification degree: polyvinyl alcohol having a lower saponification degree) is 8:2 to 4:6 by weight. When the mixing ratio is out of the above range (e.g., 1:9 by weight), since the compatibility of the mixed polyvinyl alcohol becomes high, an effect of imparting flexibility is hardly exhibited. The mixing ratio is preferably 7:3 to 5:5.

The mixed polyvinyl alcohol may be formed by mixing three or more kinds of polyvinyl alcohols having different polymerization degrees and different saponification degrees. However, in this case, each of the polyvinyl alcohols preferably satisfies the above-mentioned ranges of the polymerization degree and the saponification degree.

Examples of the mixed polyvinyl alcohol include a mixed polyvinyl alcohol formed by mixing a polyvinyl alcohol having a polymerization degree of 1700 and a saponification degree of 99 mol %, a polyvinyl alcohol having a polymerization degree of 1700 and a saponification degree of 95 mol % and a polyvinyl alcohol having a polymerization degree of 1700 and a saponification degree of 75 mol % at a weight ratio of 1:1:1.

The method of acetalization is not particularly limited and conventionally known methods can be employed. Examples of the method include a method of adding butyl aldehyde and/or acetaldehyde to an aqueous solution of the mixed polyvinyl alcohol in the presence of an acid catalyst such as hydrochloric acid, and the like.

In the acetalization, it is preferable to use butyl aldehyde and/or acetaldehyde. Thereby, it is possible to obtain a polyvinyl acetal resin composition having an excellent balance among the solubility in a solvent, flexibility and sheet strength.

By acetalizing the mixed polyvinyl alcohol, a polyvinyl acetal resin composition containing the polyvinyl acetal resin A and the polyvinyl acetal resin B can be obtained.

A preferred lower limit of the acetalization degree of the polyvinyl acetal resin A and the polyvinyl acetal resin B is 40 mol %, and a preferred upper limit thereof is 80 mol %. When the acetalization degree of the polyvinyl acetal resin A and the polyvinyl acetal resin B is less than 40 mol %, the resin becomes insoluble in an organic solvent, which may interfere with the preparation of a ceramic paste for a ceramic green sheet. When the acetalization degree of the polyvinyl acetal resin A and the polyvinyl acetal resin B is more than 80 mol %, the amount of residual hydroxyl groups becomes smaller and the toughness of the resin may be impaired. A more preferred lower limit of the acetalization degree is 55 mol % and a more preferred upper limit is 70 mol %.

In the present description, the acetalization degree refers to the percentage of the number of acetalized hydroxyl groups of the number of hydroxyl groups in the polyvinyl acetal resin A or the polyvinyl acetal resin B. As a calculation method of the acetalization degree, a method of counting two acetalized hydroxyl groups is employed to calculate mol percentage of the acetalization degree because an acetal group of the polyvinyl acetal resin A or the polyvinyl acetal resin B is formed by acetalizing two hydroxyl groups.

The polyvinyl acetal resin composition can be produced by dissolving a mixed polyvinyl alcohol containing two or more kinds of polyvinyl alcohols having different saponification degrees and then acetalizing the mixed polyvinyl alcohol, but the polyvinyl acetal resin composition may also be formed by producing two or more kinds of polyvinyl acetal resins having different saponification degrees by a common method and then mixing the resins. However, the former method of these two methods is suitable.

The polyvinyl acetal resin composition of the present invention preferably further contains an organic solvent.

The organic solvent is not particularly limited, and examples thereof include ketones, alcohols, aromatic hydrocarbons, esters, and the like.

Examples of the ketone organic solvents include acetone, methyl ethyl ketone, dipropyl ketone, diisobutyl ketone, and the like.

Examples of the alcohol organic solvents include methanol, ethanol, isopropanol, butanol, and the like.

Examples of the aromatic hydrocarbon organic solvents include toluene, xylene, and the like.

Examples of the ester organic solvents include methyl propionate, ethyl propionate, butyl propionate, methyl butanoate, ethyl butanoate, butyl butanoate, methyl pentanoate, ethyl pentanoate, butyl pentanoate, methyl hexanoate, ethyl hexanoate, butyl hexanoate, 2-ethylhexyl acetate, 2-ethylhexyl butyrate, and the like.

Moreover, as the organic solvent, for example, methyl cellosolve, ethyl cellosolve, butyl cellosolve, α-terpineol, butyl cellosolve acetate, butyl carbitol acetate, and the like can also be used.

These organic solvents may be used alone or in combination of two or more species.

A preferred lower limit of the content of the polyvinyl acetal resin (the total amount of the polyvinyl acetal resin A and the polyvinyl acetal resin B) in the polyvinyl acetal resin composition of the present invention is 1% by weight and a preferred upper limit is 50% by weight. When the content of the polyvinyl acetal resin is less than 1% by weight, the film-forming ability of the resin may be low, and when the content is more than 50% by weight, a handling property is deteriorated because of the high viscosity. A more preferred lower limit of the content of the polyvinyl acetal resin is 3% by weight and a more preferred upper limit is 33% by weight. A further preferred lower limit of the content of the polyvinyl acetal resin is 5% by weight and a further preferred upper limit is 20% by weight.

The polyvinyl acetal resin composition of the present invention can be used as a slurry composition or as a coating paste in which an inorganic powder, such as a ceramic powder, a conductive powder, or the like, is extremely well dispersed by dispersing the inorganic powder in the resin composition.

When a ceramic powder is used as an inorganic powder in using the polyvinyl acetal resin composition as the slurry composition, the slurry composition can be used as a ceramic slurry. The resulting ceramic slurry can be suitably used as a material for a ceramic green sheet of a laminated ceramic capacitor. Such a ceramic slurry also constitutes the present invention.

Further, by using the ceramic slurry of the present invention, it is possible to prepare a ceramic green sheet which is hardly damaged when being peeled off from a supporting member even when the thickness thereof is 2 μm or less.

Such a ceramic green sheet also constitutes the present invention.

When a ceramic powder is used as an inorganic powder in using the polyvinyl acetal resin composition as the coating paste, the coating paste can be used as a ceramic paste. The resulting ceramic paste can be suitably used as a ceramic paste, which is applied to an area where a conductive layer is not formed, for the purpose of filling a level difference produced after applying a conductive paste by screen printing in producing a laminated ceramic capacitor. Such a ceramic paste also constitutes the present invention.

The ceramic powder is not particularly limited, and examples thereof include ceramic powders containing alumina, zirconia, aluminum silicate, titanium oxide, zinc oxide, barium titanate, magnesia, sialon, spinel mullite, silicon carbide, silicon nitride, aluminum nitride, or the like.

When a conductive powder is used as an inorganic powder, the coating paste can be used as a conductive paste. A conductive layer formed from the resulting conductive paste is hardly damaged and suitably used for producing a laminated ceramic capacitor.

Such a conductive paste also constitutes the present invention.

The conductive powder is not particularly limited as long as it exhibits sufficient conductivity, and examples thereof include powders containing nickel, palladium, platinum, gold, silver, copper or an alloy thereof, or the like. These conductive powders may be used alone or in combination of two or more species.

To the ceramic slurry, the ceramic paste and the conductive paste of the present invention, a plasticizer, a lubricant, a dispersant, an antistatic agent or the like may be appropriately added to the extent that the effect of the present invention is not impaired.

When the polyvinyl acetal resin composition of the present invention is used for an interlayer film for laminated glass to be used for automobiles, it is possible to obtain an interlayer film for laminated glass which is hardly ruptured even if glass is broken and is scarcely broken in a stretching process, and is excellent in production efficiency. Such an interlayer film for laminated glass for automobiles also constitutes the present invention.

Effects of the Invention

According to the present invention, it is possible to provide a polyvinyl acetal resin composition capable of giving a ceramic green sheet which has sufficient flexibility and is hardly damaged even when being formed into a thin film, when the polyvinyl acetal resin composition is used as, for example, a binder for a ceramic green sheet.

Particularly when the polyvinyl acetal resin composition of the present invention is used, it becomes possible to significantly reduce the amount of the plasticizer to be added to the ceramic green sheet. As a result, it becomes possible not only to prevent the damages to the ceramic green sheet, but also to effectively prevent deformation of the ceramic green sheet resulting from the plasticizer and bleeding of the plasticizer.

Furthermore, by using the polyvinyl acetal resin composition, it is possible to provide a ceramic slurry, a ceramic paste, a ceramic green sheet, a conductive paste and an interlayer film for laminated glass for automobiles, each excellent in performance.

BRIEF DESCRIPTIONS OF THE DRAWINGS

FIG. 1 is a transmission electron micrograph of a cross-section of the resin sheet obtained in Example 1.
FIG. 2 is a transmission electron micrograph of a cross-section of the resin sheet obtained in Example 6.
FIG. 3 is a transmission electron micrograph of a cross-section of the resin sheet obtained in Comparative Example 2.
FIG. 4 is a transmission electron micrograph of a cross-section of the resin sheet obtained in Comparative Example 3.
FIG. 5 is a transmission electron micrograph of a cross-section of the resin sheet obtained in Comparative Example 7.

BEST MODE FOR CARRYING OUT THE INVENTION

Hereinafter, the present invention will be described in more detail by way of examples, but the present invention is not limited to these examples.

Example 1

130 g of a polyvinyl alcohol having a polymerization degree of 1700 and a saponification degree of 99 mol % and 130 g of a polyvinyl alcohol having a polymerization degree of 1700 and a saponification degree of 80 mol % were added to 3000 g of pure water and the mixture was stirred at a temperature of 90° C. for about 2 hours to dissolve the polyvinyl alcohols. This solution was cooled to 40° C., and to this solution, 120 g of hydrochloric acid of 35% by weight concentration and 125 g of n-butyl aldehyde were added. The temperature of the mixture was lowered to 10° C. and an acetalization reaction was carried out while keeping the temperature to precipitate a reaction product. Thereafter, the liquid temperature was kept at 40° C. for 3 hours to complete the acetalization reaction. The reaction product was neutralized, water-washed and dried by an ordinary method to obtain a white powder of a polyvinyl acetal resin. The resulting polyvinyl acetal resin was dissolved in DMSO-$d^6$ (dimethylsulfoxide), and the butyralization degree was measured using $^{13}$C-NMR (nuclear magnetic resonance spectroscopy) to obtain a butyralization degree of 56 mol %.

10 parts by weight of the obtained polyvinyl acetal resin was added to a mixed solvent of 45 parts by weight of toluene and 45 parts by weight of ethanol, and the resulting mixture was stirred to dissolve the polyvinyl acetal resin. The resulting solution was applied onto a polyethylene terephthalate (PET) film subjected to a releasing treatment in such a manner that the dried film thickness be 20 μm and dried to prepare a resin sheet of the polyvinyl acetal resin.

Example 2

A polyvinyl butylal resin was prepared in the same manner as in Example 1 using 130 g of a polyvinyl alcohol having a polymerization degree of 1700 and a saponification degree of 99 mol %, 130 g of a polyvinyl alcohol having a polymerization degree of 1700 and a saponification degree of 87.5 mol % and 130 g of n-butyl aldehyde.

The butyralization degree of the obtained polyvinyl butylal resin was 60 mol %.

A resin sheet of a polyvinyl acetal resin was prepared in the same manner as in Example 1 by using the obtained polyvinyl butylal resin.

Example 3

A polyvinyl butylal resin was prepared in the same manner as in Example 1 using 130 g of a polyvinyl alcohol having a polymerization degree of 1100 and a saponification degree of 99 mol %, 130 g of a polyvinyl alcohol having a polymerization degree of 1100 and a saponification degree of 78 mol % and 120 g of n-butyl aldehyde.

The butyralization degree of the obtained polyvinyl butylal resin was 60 mol %.

A resin sheet of a polyvinyl acetal resin was prepared in the same manner as in Example 1 by using the obtained polyvinyl butylal resin.

Example 4

A polyvinyl butylal resin was prepared in the same manner as in Example 1 using 130 g of a polyvinyl alcohol having a polymerization degree of 800 and a saponification degree of 99 mol %, 130 g of a polyvinyl alcohol having a polymerization degree of 1700 and a saponification degree of 78 mol % and 122 g of n-butyl aldehyde.

The butyralization degree of the obtained polyvinyl butylal resin was 57 mol %.

A resin sheet of a polyvinyl acetal resin was prepared in the same manner as in Example 1 by using the obtained polyvinyl butylal resin.

Example 5

A polyvinyl butylal resin was prepared in the same manner as in Example 1 using 91 g of a polyvinyl alcohol having a polymerization degree of 1700 and a saponification degree of 99 mol %, 38 g of a polyvinyl alcohol having a polymerization degree of 800 and a saponification degree of 99 mol %, 131 g of a polyvinyl alcohol having a polymerization degree of 1100 and a saponification degree of 78 mol %, and 122 g of n-butyl aldehyde.

The butyralization degree of the obtained polyvinyl butylal resin was 57 mol %.

A resin sheet of a polyvinyl acetal resin was prepared in the same manner as in Example 1 by using the obtained polyvinyl butylal resin.

Example 6

A polyvinyl butylal resin was prepared in the same manner as in Example 1 using 195 g of a polyvinyl alcohol having a polymerization degree of 1700 and a saponification degree of 99 mol %, 65 g of a polyvinyl alcohol having a polymerization degree of 1700 and a saponification degree of 80 mol % and 135 g of n-butyl aldehyde.

The butyralization degree of the obtained polyvinyl butylal resin was 62 mol %.

A resin sheet of a polyvinyl acetal resin was prepared in the same manner as in Example 1 by using the obtained polyvinyl butylal resin.

Example 7

A polyvinyl butylal resin was prepared in the same manner as in Example 1 using 156 g of a polyvinyl alcohol having a polymerization degree of 1700 and a saponification degree of 99 mol %, 104 g of a polyvinyl alcohol having a polymerization degree of 1700 and a saponification degree of 80 mol % and 126 g of n-butyl aldehyde.

The butyralization degree of the obtained polyvinyl butylal resin was 59 mol %.

A resin sheet of a polyvinyl acetal resin was prepared in the same manner as in Example 1 by using the obtained polyvinyl butylal resin.

Example 8

A polyvinyl butylal resin was prepared in the same manner as in Example 1 using 104 g of a polyvinyl alcohol having a polymerization degree of 1700 and a saponification degree of 99 mol %, 78 g of a polyvinyl alcohol having a polymerization degree of 800 and a saponification degree of 98 mol %, 52 g of a polyvinyl alcohol having a polymerization degree of 1700 and a saponification degree of 78 mol %, 26 g of a polyvinyl alcohol having a polymerization degree of 1100 and a saponification degree of 82 mol %, and 123 g of n-butyl aldehyde.

The butyralization degree of the obtained polyvinyl butylal resin was 57 mol %.

A resin sheet of a polyvinyl acetal resin was prepared in the same manner as in Example 1 by using the obtained polyvinyl butylal resin.

Comparative Example 1

A polyvinyl butylal resin was prepared by the same method as in Example 1 using 260 g of a polyvinyl alcohol having a polymerization degree of 1700 and a saponification degree of 99 mol % and 150 g of n-butyl aldehyde.

The butyralization degree of the resulting polyvinyl butylal resin was 66 mol %.

A resin sheet of a polyvinyl acetal resin was prepared in the same manner as in Example 1 using the obtained polyvinyl butylal resin.

Comparative Example 2

A polyvinyl butylal resin was prepared by the same method as in Example 1 using 260 g of a polyvinyl alcohol having a polymerization degree of 1700 and a saponification degree of 89 mol % and 129 g of n-butyl aldehyde.

The butyralization degree of the resulting polyvinyl butylal resin was 60 mol %.

A resin sheet of a polyvinyl acetal resin was prepared in the same manner as in Example 1 using the obtained polyvinyl butylal resin.

Comparative Example 3

A polyvinyl butylal resin was prepared by the same method as in Example 1 using 130 g of a polyvinyl alcohol having a polymerization degree of 1700 and a saponification degree of 98 mol %, 130 g of a polyvinyl alcohol having a polymerization degree of 1700 and a saponification degree of 90 mol %, and 130 g of n-butyl aldehyde.

The butyralization degree of the resulting polyvinyl butylal resin was 61 mol %.

A resin sheet of a polyvinyl acetal resin was prepared in the same manner as in Example 1 using the obtained polyvinyl butylal resin.

Comparative Example 4

A polyvinyl butylal resin was prepared by the same method as in Example 1 using 130 g of a polyvinyl alcohol having a polymerization degree of 1700 and a saponification degree of 88.5 mol %, 130 g of a polyvinyl alcohol having a polymerization degree of 1700 and a saponification degree of 80 mol %, and 110 g of n-butyl aldehyde.

The butyralization degree of the resulting polyvinyl butylal resin was 51 mol %.

A resin sheet of a polyvinyl acetal resin was prepared in the same manner as in Example 1 using the obtained polyvinyl butylal resin.

Comparative Example 5

A polyvinyl butylal resin was prepared by the same method as in Example 1 using 91 g of a polyvinyl alcohol having a polymerization degree of 800 and a saponification degree of 95 mol %, 169 g of a polyvinyl alcohol having a polymerization degree of 2500 and a saponification degree of 79 mol %, and 122 g of n-butyl aldehyde.

The butyralization degree of the resulting polyvinyl butylal resin was 57 mol %.

A resin sheet of a polyvinyl acetal resin was prepared in the same manner as in Example 1 using the obtained polyvinyl butylal resin.

Comparative Example 6

A polyvinyl butylal resin was prepared by the same method as in Example 1 using 130 g of a polyvinyl alcohol having a polymerization degree of 3300 and a saponification degree of 99 mol %, 130 g of a polyvinyl alcohol having a polymerization degree of 500 and a saponification degree of 79 mol %, and 122 g of n-butyl aldehyde.

The butyralization degree of the resulting polyvinyl butylal resin was 57 mol %.

A resin sheet of a polyvinyl acetal resin was prepared in the same manner as in Example 1 using the obtained polyvinyl butylal resin.

Comparative Example 7

A polyvinyl butylal resin was prepared by the same method as in Example 1 using 234 g of a polyvinyl alcohol having a polymerization degree of 1700 and a saponification degree of 99 mol %, 26 g of a polyvinyl alcohol having a polymerization degree of 1700 and a saponification degree of 80 mol %, and 146 g of n-butyl aldehyde.

The butyralization degree of the resulting polyvinyl butylal resin was 65 mol %.

A resin sheet of a polyvinyl acetal resin was prepared in the same manner as in Example 1 using the obtained polyvinyl butylal resin.

Comparative Example 8

A polyvinyl butylal resin was prepared by the same method as in Example 1 using 26 g of a polyvinyl alcohol having a polymerization degree of 1700 and a saponification degree of 99 mol %, 234 g of a polyvinyl alcohol having a polymerization degree of 1700 and a saponification degree of 80 mol %, and 106 g of n-butyl aldehyde.

The butyralization degree of the resulting polyvinyl butylal resin was 45 mol %.

A resin sheet of a polyvinyl acetal resin was prepared in the same manner as in Example 1 using the obtained polyvinyl butylal resin.

Comparative Example 9

A polyvinyl butylal resin was prepared by the same method as in Example 1 using 78 g of a polyvinyl alcohol having a polymerization degree of 1700 and a saponification degree of 93 mol %, 104 g of a polyvinyl alcohol having a polymerization degree of 1700 and a saponification degree of 86 mol %, 78 g of a polyvinyl alcohol having a polymerization degree of 1700 and a saponification degree of 79 mol %, and 116 g of n-butyl aldehyde.

The butyralization degree of the resulting polyvinyl butylal resin was 52 mol %.

A resin sheet of a polyvinyl acetal resin was prepared in the same manner as in Example 1 using the obtained polyvinyl butylal resin.
(Evaluations)

The following evaluations were performed on the resin sheets obtained in examples and comparative examples.

The results of evaluations are shown in Table 1. The results of Examples 1 to 5 and Comparative Examples 1 to 6 are shown in Table 1 and the results of Examples 6 to 8 and Comparative Examples 7 to 9 are shown in Table 2.

Further, in Tables 1 and 2, calculated saponification degrees calculated by inclined allocation in terms of the relative weight ratio of the two kinds of polyvinyl alcohols, and calculated polymerization degrees calculated by inclined allocation in terms of the relative molar ratio of the two kinds of polyvinyl alcohols are shown.
(Confirmation of State of Cross-Section)

With respect to each sample extracted from the obtained resin sheets, a specimen of a cross-section was prepared by cutting the sample using a microtome, and then micrographs of the cross-section were taken at a magnification of 3000 times using a transmission electron microscope (TEM). Images of the specimens taken from the resin sheets obtained in Examples 1 and 6 and Comparative Examples 2, 3 and 7 are shown in FIGS. 1 to 5, respectively.

Next, diameters of all phases composed of the island component, which can be identified from the obtained images, were measured, and the range of the diameters, in which 80% of the phases composed of the island component are contained when the total number of the phases composed of the island component is taken as 100%, was defined as the dispersion diameter. Here, when the phase composed of the island component had a shape other than a sphere, the average of the longer diameter and the shorter diameter was taken as the diameter.

The present inventors determined, from the obtained images and dispersion diameters, whether a sea-island structure was formed or not. A structure, in which the boundary of the sea component and the island component is clear and the phase composed of the island component is dispersed in a dispersion diameter of 0.07 µm or more, was recognized as a "sea-island structure", and a structure, in which the boundary of the sea component and the island component is not clear or the dispersion diameter is less than 0.07 µm was recognized as a "compatible structure".

In Comparative Examples 4 and 5 in which the boundary of the sea component and the island component is not clear, the dispersion diameter was not measured. Further, in Comparative Examples 1 and 2 in which one kind of a polyvinyl alcohol was used, the state of the cross-section was not confirmed.
(Tensile Elastic Modulus)

The tensile elastic modulus (MPa) was measured at a tensile speed of 20 mm/min according to JIS K 7113 using TENSILON (manufactured by ORIENTEC Co., Ltd.).
(Elongation at Break)

A tensile test was performed at a tensile speed of 50 mm/min in an atmosphere of 20° C. and 50% in RH to measure the elongation at break (%) using a No. 3 dumbbell specimen cut from a plate-shaped body according to JIS K 6301 (Physical Testing Methods for Vulcanized Rubber).

TABLE 1

| | Saponification degree (mol %) | Polymerization degree | Mixing ratio (%) | M/N | Calculated saponification degree | Calculated polymerization degree | State of cross-section | Dispersion diameter (µm) | Elongation at break (%) | Elastic modulus (MPa) |
|---|---|---|---|---|---|---|---|---|---|---|
| Example 1 | 99 | 1700 | 50 | 1 | 89.5 | 1700 | sea-island structure | 0.1~0.4 | 25 | 500 |
| | 80 | 1700 | 50 | | | | | | | |
| Example 2 | 99 | 1700 | 50 | 1 | 92.5 | 1700 | sea-island structure | 0.1~0.3 | 20 | 580 |
| | 87.5 | 1700 | 50 | | | | | | | |
| Example 3 | 99 | 1100 | 50 | 1 | 88.5 | 1100 | sea-island structure | 0.1-0.3 | 20 | 380 |
| | 78 | 1100 | 50 | | | | | | | |
| Example 4 | 99 | 800 | 50 | 2.13 | 89 | 1160 | sea-island structure | 0.08~0.15 | 19 | 320 |
| | 78 | 1700 | 50 | | | | | | | |
| Example 5 | 99 | 1700 | 35 | 1.55 | 89 | 1220 | sea-island structure | 0.1~0.3 | 18 | 280 |
| | 99 | 800 | 15 | | | | | | | |
| | 78 | 1100 | 50 | | | | | | | |
| Comparative Example 1 | 99 | 1700 | — | — | 99 | 1700 | — | — | 12 | 700 |
| Comparative | 89 | 1700 | — | — | 89 | 1700 | — | — | 24 | 150 |

TABLE 1-continued

| | Saponification degree (mol %) | Polymerization degree | Mixing ratio (%) | M/N | Calculated saponification degree | Calculated polymerization degree | State of cross-section | Dispersion diameter (μm) | Elongation at break (%) | Elastic modulus (MPa) |
|---|---|---|---|---|---|---|---|---|---|---|
| Example 2 Comparative Example 3 | 98 90 | 1700 1700 | 50 50 | 1 | 94 | 1700 | compatible | — | 13 | 550 |
| Comparative Example 4 | 88.5 80 | 1700 1700 | 50 50 | 1 | 83 | 1700 | compatible | — | 20 | 200 |
| Comparative Example 5 | 95 79 | 800 2500 | 35 65 | 3.13 | 89 | 1680 | compatible | 0.01~0.05 | 16 | 300 |
| Comparative Example 6 | 99 79 | 3300 500 | 50 50 | 6.6 | 89 | 1290 | compatible | — | 13 | 150 |

TABLE 2

| | Saponification degree (mol %) | Polymerization degree | Mixing ratio (%) | M/N | Calculated saponification degree | Calculated polymerization degree | State of cross-section | Dispersion diameter (μm) | Elongation at break (%) | Elastic modulus (MPa) |
|---|---|---|---|---|---|---|---|---|---|---|
| Example 6 | 99 80 | 1700 1700 | 75 25 | 1 | 94.2 | 1700 | sea-island structure | 0.08~0.3 | 18 | 650 |
| Example 7 | 99 80 | 1700 1700 | 60 40 | 1 | 91.7 | 1700 | sea-island structure | 0.09~0.3 | 22 | 550 |
| Example 8 | 99 98 78 82 | 1700 800 1700 1100 | 40 20 30 10 | 1 | 90.8 | 1400 | sea-island structure | 0.1~0.3 | 22 | 520 |
| Comparative Example 7 | 99 80 | 1700 1700 | 90 10 | 1 | 97 | 1700 | compatible | 0.01~0.05 | 12 | 650 |
| Comparative Example 8 | 99 80 | 1700 1700 | 10 90 | 1 | 82 | 1700 | compatible | 0.01~0.05 | 23 | 180 |
| Comparative Example 9 | 93 86 79 | 1700 1700 | 30 40 30 | 1.55 | 86 | 1500 | compatible | — | 16 | 170 |

The state of a cross-section was confirmed using a TEM, and consequently it was confirmed that in each of the polyvinyl acetal resins obtained in Examples 1 to 8, a sea-island structure was formed. The results of Examples 1 and 6 are shown in FIGS. 1 and 2.

Moreover, TEM images of Examples 1 to 8 were observed, and consequently it was found that in Example 1, since the amounts of the two components added were the same and the polymerization degrees of the two components were the same, it was difficult to determine which component was the sea component or the island component. Also in Examples 2 and 3, it was difficult to determine which component was the sea component or the island component.

In Examples 4 and 5, it was observed that a component having a higher polymerization degree was the sea component and the other component was the island component.

In Examples 6, 7 and 8, it was observed that a polyvinyl acetal resin containing the polyvinyl alcohol added in a larger amount became the sea component and the other component became the island component.

On the other hand, it was confirmed that polyvinyl acetal resins obtained in comparative examples are compatibilized with each other and the sea-island structure was not formed. The results of Comparative Examples 2, 3 and 7 are shown in FIGS. 3 to 5.

From these results, it was found that as shown in Table 1, polyvinyl acetal resins obtained in examples have not only larger elongation at break but also higher tensile elastic modulus than those of polyvinyl acetal resins obtained in comparative examples.

From these, it was found that the polyvinyl acetal resins obtained in examples have sufficient strength and flexibility.

INDUSTRIAL APPLICABILITY

According to the present invention, it is possible to provide a polyvinyl acetal resin composition capable of giving a ceramic green sheet which has sufficient flexibility and is hardly damaged even when being formed into a thin film, when the polyvinyl acetal resin composition is used as, for example, a binder for a ceramic green sheet. It is also possible to provide a ceramic slurry, a ceramic paste, a ceramic green sheet, a conductive paste and an interlayer film for laminated glass for automobiles, each produced by using the polyvinyl acetal resin composition.

The invention claimed is:

1. A polyvinyl acetal resin composition,
which comprises a polyvinyl acetal resin A and a polyvinyl acetal resin B incompatible with said polyvinyl acetal resin A,
which is formed by acetalizing a mixed polyvinyl alcohol containing two or more kinds of polyvinyl alcohols having different saponification degrees, and
wherein said mixed polyvinyl alcohol contains main two kinds of polyvinyl alcohols in which X and Y satisfy the relationship of the following equation (1):

[Formula 1]

$$|X-Y| \geqq 10 \tag{1}$$

in which X represents the saponification degree of any one polyvinyl alcohol a of the polyvinyl alcohols contained in the mixed polyvinyl alcohol and Y represents the saponification degree of a polyvinyl alcohol b other than the polyvinyl alcohol a, and wherein in denoting, by M, the polymerization degree of one polyvinyl alcohol having a higher polymerization degree of said main two kinds of polyvinyl alcohols and denoting the polymerization degree of the other polyvinyl alcohol by N, M and N have the relationship of the following equation (2):

[Formula 2]

$$M/N \geq 3 \quad (2)$$

and a phase composed of said polyvinyl acetal resin A and a phase composed of said polyvinyl acetal resin B form a sea-island structure.

2. The polyvinyl acetal resin composition according to claim 1,
wherein the mixed polyvinyl alcohol comprises a polyvinyl alcohol having a saponification degree of 95 mol % or more and a polyvinyl alcohol having a saponification degree of 85 mol % or less.

3. The polyvinyl acetal resin composition according to claim 1,
wherein in the mixed polyvinyl alcohol, the mixing ratio of the polyvinyl alcohol having a higher saponification degree of the main two kinds of polyvinyl alcohols to the other polyvinyl alcohol is 8:2 to 4:6 by weight.

4. The polyvinyl acetal resin composition according to claim 1,
which is formed by acetalizing a mixed polyvinyl alcohol with butyl aldehyde and/or acetoaldehyde.

5. The polyvinyl acetal resin composition according to claim 1,
further comprising an organic solvent.

6. A ceramic slurry which is formed by using the polyvinyl acetal resin composition according to claim 1.

7. A ceramic paste which is formed by using the polyvinyl acetal resin composition according to claim 1.

8. A ceramic green sheet which is formed by using the polyvinyl acetal resin composition according to claim 1.

9. A conductive paste which is formed by using the polyvinyl acetal resin composition according to claim 1.

10. An interlayer film for laminated glass for automobiles which is formed by using the polyvinyl acetal resin composition according to claim 1.

* * * * *